US008413605B2

(12) United States Patent
Baynard et al.

(10) Patent No.: US 8,413,605 B2
(45) Date of Patent: Apr. 9, 2013

(54) SQUIRREL GUARD FOR A BIRD FEEDER

(75) Inventors: D. Calvin Baynard, Manning, SC (US);
Keith Unger, Greenville, SC (US)

(73) Assignee: D. Calvin Baynard, Manning, SC (US)

( * ) Notice: Subject to any disclaimer, the term of this patent is extended or adjusted under 35 U.S.C. 154(b) by 0 days.

(21) Appl. No.: 13/187,608

(22) Filed: Jul. 21, 2011

(65) Prior Publication Data

US 2011/0271910 A1    Nov. 10, 2011

Related U.S. Application Data

(63) Continuation-in-part of application No. 12/586,487, filed on Sep. 23, 2009, now abandoned.

(51) Int. Cl.
*A01K 39/01* (2006.01)
(52) U.S. Cl. ........................ 119/52.3; 119/57.9
(58) Field of Classification Search ................. 119/52.3, 119/469, 57.8, 57.9, 52.2, 61.3, 61.57
See application file for complete search history.

(56) References Cited

U.S. PATENT DOCUMENTS

| | | | | |
|---|---|---|---|---|
| 2,891,508 | A | * | 6/1959 | Bower .......................... 119/52.3 |
| 2,961,995 | A | | 11/1960 | Martin |
| 3,090,354 | A | | 5/1963 | Merritt et al. |
| 3,780,703 | A | | 12/1973 | Boehland, Jr. |
| 4,188,913 | A | | 2/1980 | Earl et al. |
| 4,259,927 | A | | 4/1981 | Clarke |
| 4,389,975 | A | | 6/1983 | Fisher, Jr. |
| 4,498,423 | A | | 2/1985 | Gainsboro et al. |
| 4,523,546 | A | * | 6/1985 | Latham ......................... 119/57.9 |
| 4,558,662 | A | | 12/1985 | Peterson |
| 4,765,277 | A | * | 8/1988 | Bailey et al. .................. 119/57.9 |
| 4,821,681 | A | * | 4/1989 | Tucker ........................ 119/51.01 |
| 4,829,934 | A | * | 5/1989 | Blasbalg ....................... 119/57.8 |
| 4,942,845 | A | | 7/1990 | Lane |
| 5,062,390 | A | | 11/1991 | Bescherer et al. |
| D330,097 | S | | 10/1992 | Bescherer et al. |
| 5,156,112 | A | * | 10/1992 | Brown .......................... 119/57.9 |
| D333,538 | S | | 2/1993 | Kingsley |
| 5,195,460 | A | * | 3/1993 | Loken .......................... 119/57.9 |
| 5,255,631 | A | * | 10/1993 | Anderson ..................... 119/52.2 |
| 5,291,855 | A | | 3/1994 | Laverty |
| 5,309,867 | A | * | 5/1994 | Cruz ............................ 119/52.3 |
| 5,479,879 | A | * | 1/1996 | Biek ............................. 119/52.2 |
| 5,507,249 | A | | 4/1996 | Shaw |
| 5,558,040 | A | | 9/1996 | Colwell |
| 5,724,912 | A | * | 3/1998 | Cull ............................. 119/57.2 |
| 5,775,256 | A | * | 7/1998 | Henshaw ...................... 119/57.8 |
| 5,775,257 | A | | 7/1998 | Park |
| 5,921,201 | A | * | 7/1999 | Green .......................... 119/52.3 |

(Continued)

*Primary Examiner* — Yvonne Abbott
(74) *Attorney, Agent, or Firm* — Cort Flint

(57) ABSTRACT

A squirrel guard for use with a bird feeder which stores and dispenses bird seed. The feeder comprises an upstanding housing and a support for positioning the feeder in an elevated position. The squirrel guard comprises a generally round and planar tray mounted beneath the feeder. The tray acts to deny squirrel access to the bird seeds and also as a collection tray for spilled bird seed. A tilt connector is arranged beneath the lower side for supporting the tray in a generally horizontal position when carrying only a minimal weight such as bird seed and small birds. The connector is such that the tray tilts to a generally diagonal position when engaged with a relatively heavy weight such as a squirrel. When engaged by a squirrel the tray moves to the tilted position causing the squirrel to fall from the tray.

42 Claims, 10 Drawing Sheets

U.S. PATENT DOCUMENTS

| | | | | |
|---|---|---|---|---|
| 6,085,692 A * | 7/2000 | Adams | | 119/51.03 |
| 6,397,779 B1 * | 6/2002 | Bonne | | 119/51.01 |
| 6,401,658 B1 * | 6/2002 | Teets | | 119/57.9 |
| 6,561,128 B1 * | 5/2003 | Carter | | 119/57.9 |
| 6,591,781 B2 * | 7/2003 | Hardison | | 119/57.9 |
| 6,986,322 B2 | 1/2006 | Lumpkin et al. | | |
| 7,168,392 B2 * | 1/2007 | Kuelbs | | 119/452 |
| 7,234,416 B2 * | 6/2007 | Hoff | | 119/57.9 |
| 7,373,901 B2 * | 5/2008 | Baynard | | 119/57.9 |
| 7,409,922 B1 * | 8/2008 | Baynard et al. | | 119/52.3 |
| 7,798,099 B2 * | 9/2010 | Vosbikian | | 119/52.3 |
| 2003/0033985 A1 * | 2/2003 | Hardison | | 119/57.9 |
| 2006/0249089 A1 * | 11/2006 | Behunin | | 119/61.57 |
| 2008/0210172 A1 * | 9/2008 | Waikas | | 119/52.3 |

* cited by examiner

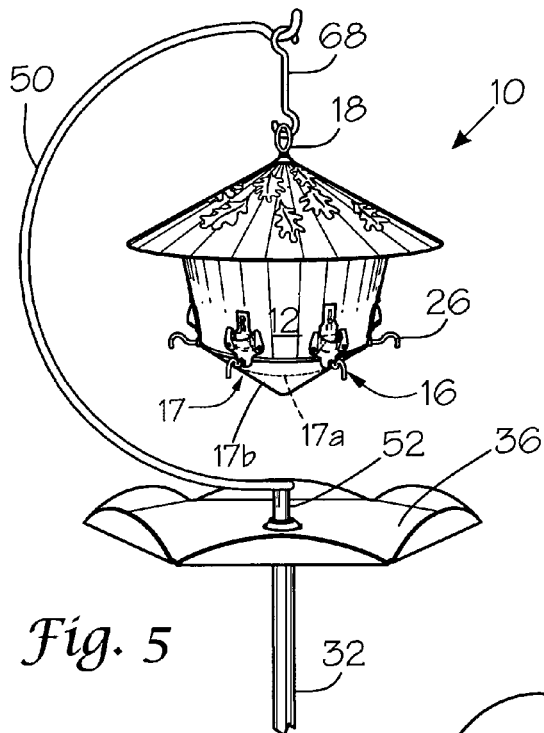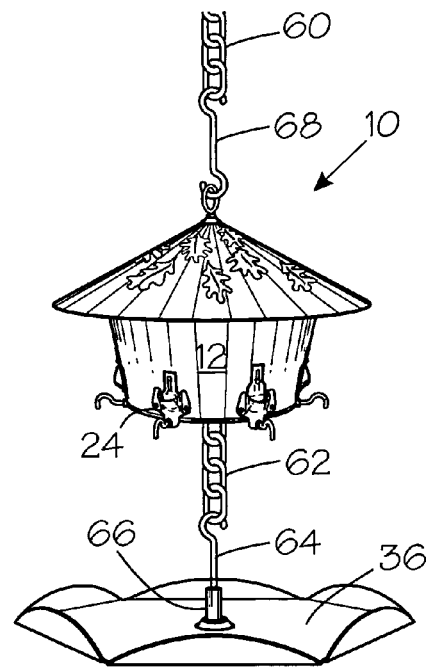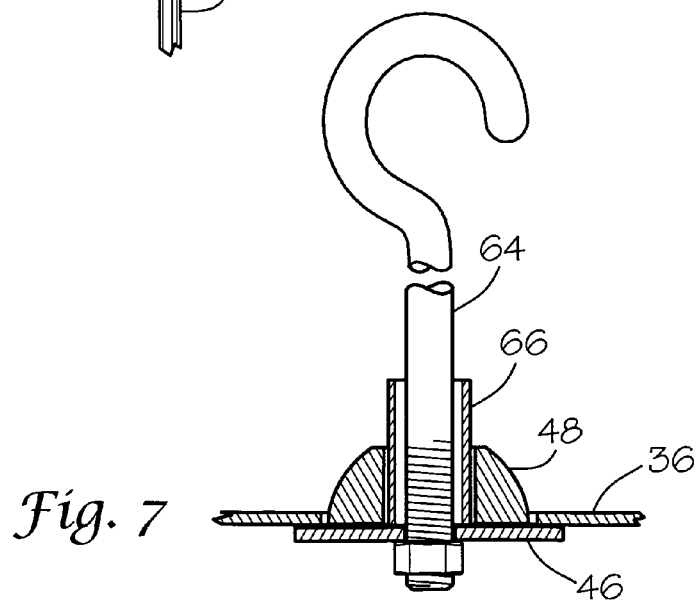
Fig. 5
Fig. 6
Fig. 7

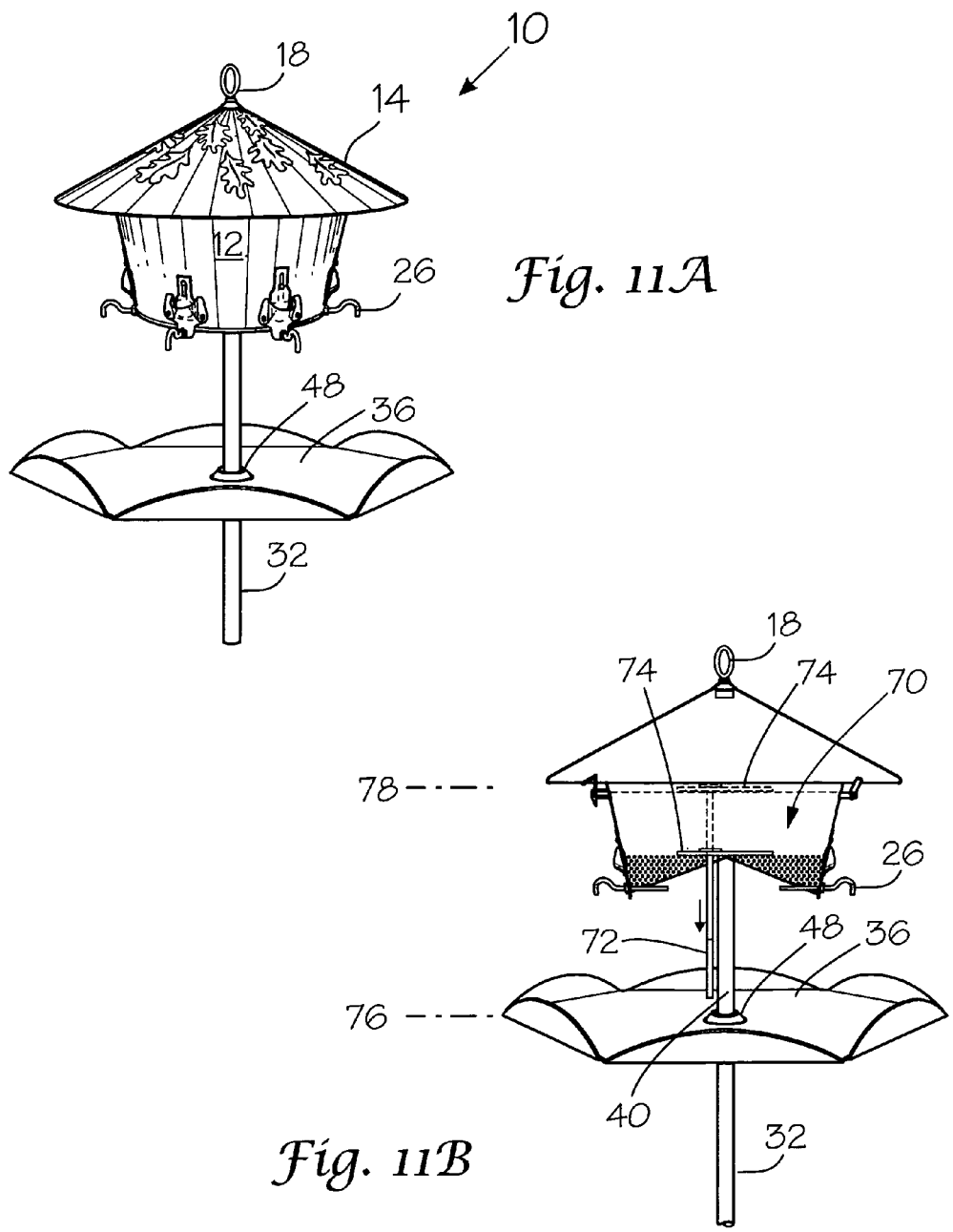

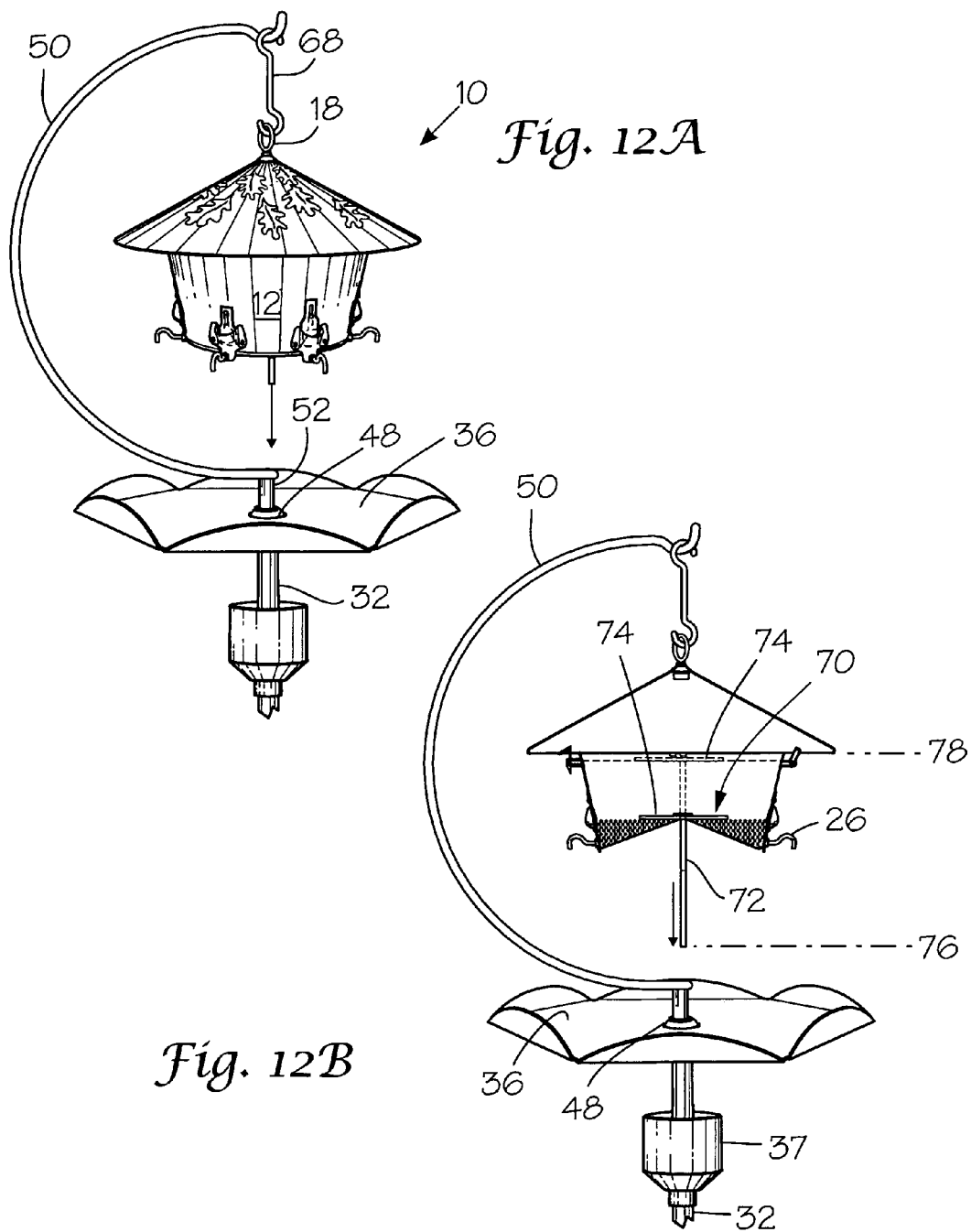

SQUIRREL GUARD FOR A BIRD FEEDER

BACKGROUND OF THE INVENTION

This invention is directed to a squirrel guard in combination with a bird feeder. As is well-known, bird feeders store and dispense bird seed for birds. A problem with most bird feeders is encroachment by small animals, especially squirrels.

There have been numerous attempts to build bird feeders to include apparatus to prevent access to the seed by these animals, especially squirrels.

Attempts to provide squirrel guards are shown in applicant's U.S. Pat. Nos. 7,373,901 B2 and 7,409,992 B1.

It was found that squirrels could bypass these guards because they were mounted in stable positions.

Accordingly, it is a primary object of the instant invention to provide a collection tray for collecting spilled seed which also functions as a squirrel guard which blocks squirrel access to the bird feeder.

Another object of the invention is the provision of a squirrel guard movable between a horizontal collection position and a diagonal or tilted discharge position in dependence upon the weight applied to its upper surface.

Another object of the invention is the provision of various mounting structures which will accommodate such a squirrel guard between these positions and yet support it in position relative to the feeder.

SUMMARY OF THE INVENTION

The instant invention is directed to a squirrel guard for use with a bird feeder. The bird feeder acts to store and dispense the feed comprising an upstanding housing formed along a vertical axis and includes side walls, a roof and a floor adjacent to its lower side. A support is provided for positioning the feeder in an elevated position. The squirrel guard comprises a generally round and planar tray, with a circular opening about its central axis and is mounted beneath the lower side. The tray acts to prevent squirrel access to the bird seeds and as a collection tray for spilled bird seed.

A tilt connector is arranged beneath the lower side and supports the tray in a generally horizontal position perpendicular to the vertical axis when only a minimal weight, such as bird seed and small birds, is carried by said tray. The connector allows the tray to tilt relative to the vertical axis and move to a generally diagonal discharge position when it is engaged with a relatively heavy weight, such as a squirrel and the like. Therefore, in use, the tray normally remains in the horizontal position collecting spilled bird seed but moves to the discharge position when engaged by a squirrel, and the like, causing the squirrel to fall from the tray.

The connector may comprise a multi-directional connector having a rod extending between said feeder and said tray. Preferably, the rod is located beneath the lower side and extending downwardly through the opening. A flat washer, which supports a cone-shaped washer, is secured with the rod in spaced position beneath the lower side. The flat washer supports the tray in the generally horizontal position while the cone-shaped washer maintains the tray centered about the vertical axis, allowing the tray to pivot to the discharge position when the tray is engaged by a squirrel and guides the tray back to the horizontal position upon departure of the squirrel.

An extension may be engaged with the upper end of the rod and the lower side of the feeder. The extension acts to support the feeder in an elevated position and to position the feeder in fixed position relative to the upper end of the rod.

The connector may comprise a chain connecting the base of the bird feeder to the tray which provides easy tilting and animal discharge, or a plurality of flexible extensions extending parallel of the vertical axis and perpendicular of the lower side and the tray. The extensions are engaged with the tray generally adjacent and about the circular opening and with the feeder.

The extensions may be engaged with a ring located beneath the lower portion of the feeder. There may be a circular guard positioned about the flexible extensions and restriction on the tray.

The connector may comprise a rod pivotally secured with at least one of the lower side and the tray along the vertical axis. The pivotal engagement allows the tray to move between the discharge position and the horizontal position.

The connector may comprise a rod fixed at one end with the lower side along the vertical axis. The opposite end of the rod carries a flat washer supporting on its upper side a cone-shaped washer. The tray is supported and positioned by the flat washer and the cone-shaped washer.

The connector may comprise a pole extending vertically from the ground and having at its upper end an extension passing through the circular opening. The extension carries a flat washer and a cone-shaped washer. The cone-shaped washer extends through the circular opening allowing the tray to be separated on the flat washer centrally of the axis of the pole. A C-shaped rod, which engages at one end with the extension and at an opposite end with the roof, holds the feeder in position above the tray.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 5 is a perspective view of the same tray support with a C-shaped feeder support:

FIG. 6 is a perspective view of the same tray support with a C-shaped feeder support;

FIG. 7 is a side view of the hook and tray support;

FIGS. 11A-11B show the bird feeder and squirrel guard of the invention incorporating a seek monitor for measuring the level of seek in the bird feeder;

FIGS. 12A-12B show the seed monitor incorporated in another embodiment of the invention.

DESCRIPTION OF A PREFERRED EMBODIMENT

Referring now in more detail to the drawings, the invention will now be described in more detail.

Figure 1A:
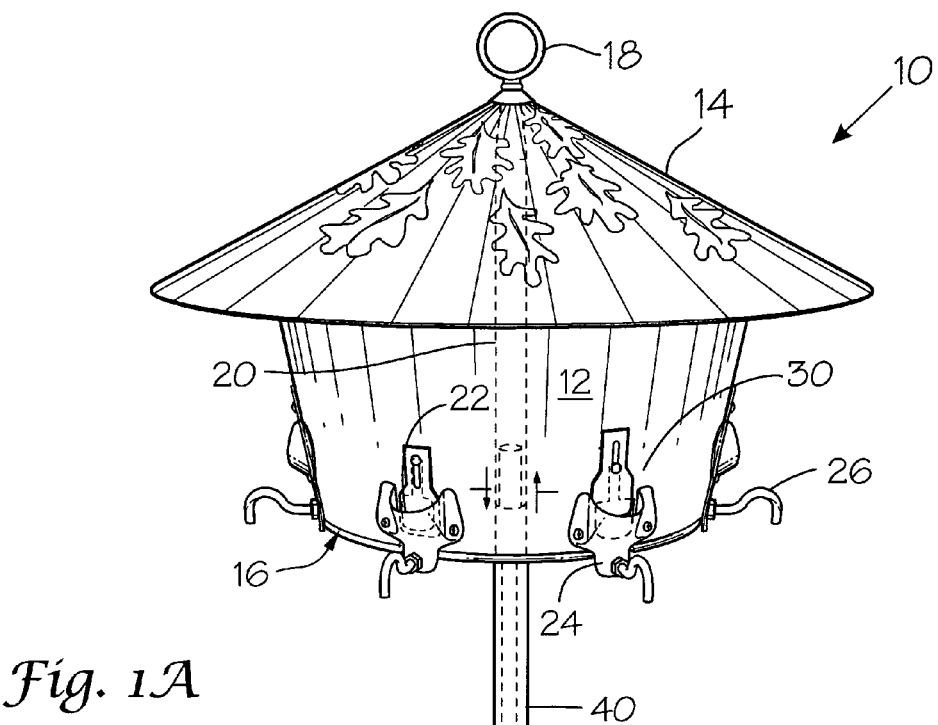
FIG. 1 is a perspective view of a bird feeder and a squirrel guard in accordance with the instant invention.
Figure 1B:
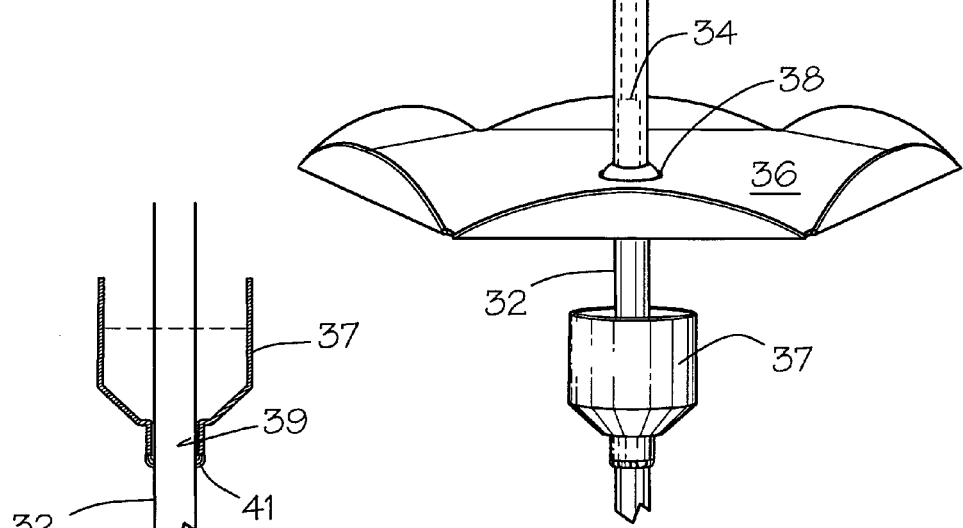
Figure 2:
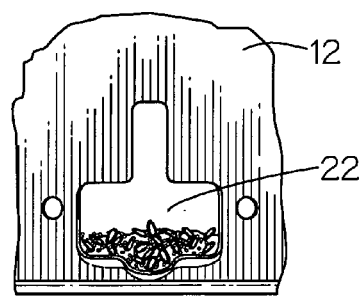
FIG. 2 is a sectional plane view of the feeder openings.

A typical bird feeder, according to the invention, is shown in FIG. 1. Feeder 10 is preferably made of metal and consists of a circular housing 12 having a slightly tapered vertical wall 12a, a roof 14, a lower side 16, including a floor 17. Various arrangements, including a ring 18 attached with roof 14, or a receptor or connector 20 associated with the floor and lower side 16, may be employed to assist in supporting feeder 10 in an elevated position. Floor 17 may be a double floor including a perforated floor 17a and a solid bottom floor 17b (FIG. 5). Any water in the feeder will flow to the solid bottom floor so the seed will not sit in the water and mold. The perforated floor can be sheet metal with holes, screen, etc. Water collected in the well in the bottom floor can be drained from a closeable drain hole.

Arranged about the housing of feeder 10 are openings 22 which are in the general shape of an inverted T. A collar 24 is positioned adjacent and below each opening forming a feed channel. A threaded perch 26 extends outwardly from the feed channel in known manner. The outer edges of collar 24 forming the feeder also function to engage or receive the outer ends of door 30. Door 30 is adjustable vertically to adjust the size of opening 22 which controls the delivery of the bird seed to the feeder 10. For this purpose a metal setscrew is provided on which door slot 30a slides and is set in a desired position. Perches 26 may also be adjusted axially by a threaded connection to accommodate different size birds.

Figure 9:
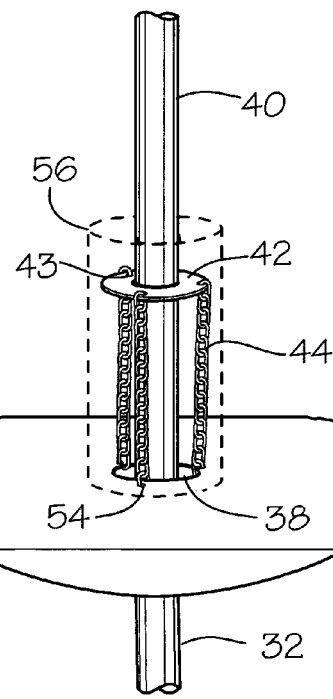
FIG. 9 is similar to FIG. 8 showing the cover cam in broken lines.

The squirrel guard comprises a planar tray 36 having a circular opening 38 formed about its center axis. The size of the opening may vary as desired to provide a tilt space between the edge of the opening and a pole support. The outer edge of tray 36 may be circular, may include a plurality of upturned edges as desired, or may be of any other suitable shapes. The inner edges of the opening may be reinforced and/or they may contain a plurality of openings 54 as shown in FIG. 9. The planar upper surface is desired when the tray is intended for its primary function, i.e., use as a squirrel guard. The upper surface, having upturned edges, is desired when the tray functions primarily as a seed saver.

An ant moat 37 is carried below plate 36 to create a barrier to keep ants out of the feeder. The moat includes a bowl 39 having an opening 39a receiving pole 32. The bowl may be welded at 41 to the pole. The moat is filled with water to make an effective barrier.

Numerous mechanisms may be employed to position the feeder in an elevated position. A first of these may include a flexible member, such as C-shaped rod 50 or chain 60, engaged with ring 18 as shown in FIGS. 5 and 6. Another and more usual mechanism would include pole 32 secured in the ground to extend vertically with feeder 10 supported at its lower side 16 by the upper end of the pole as shown in FIG. 1.

Figure 3:
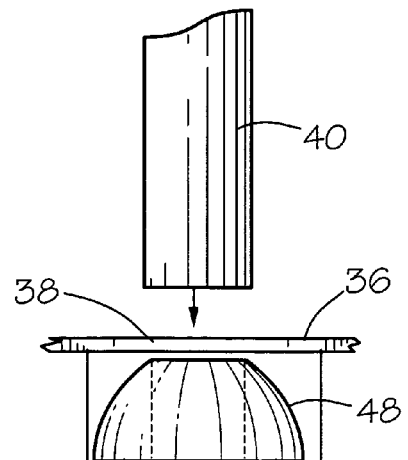
FIG. 3 is a sectional side view of the pole connection and support for the flat and oval washers along with the tray.
Figure 4:
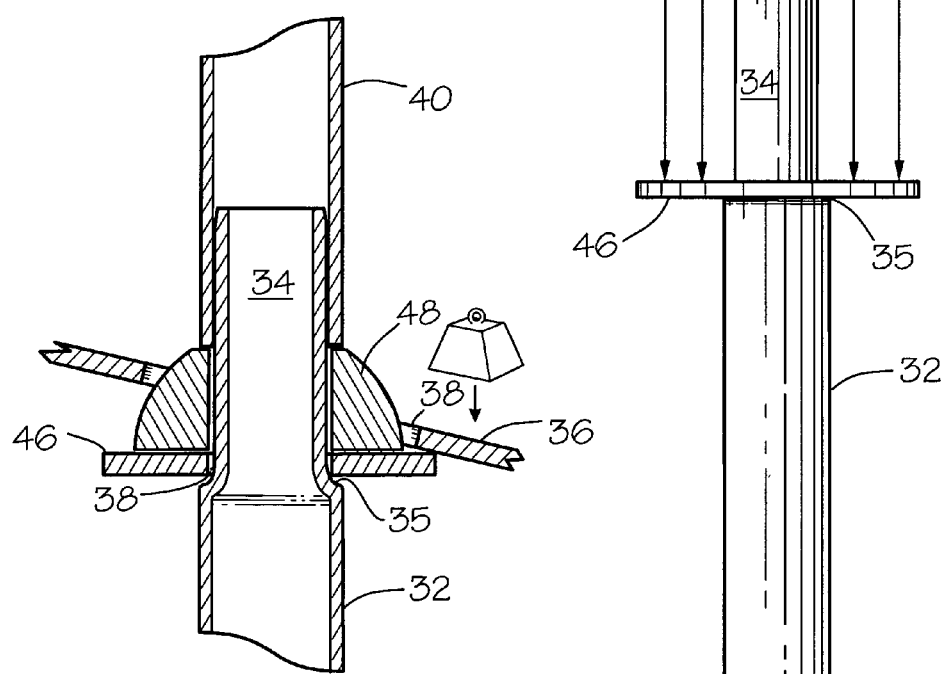
FIG. 4 is a cutaway sectional view of the interconnected pole supporting the tray in a diagonal position.

A first of several arrangements of the latter mounting arrangement is shown in FIGS. 1, 3 and 4. Here pole 32 is shown in the vertical position. Formed on its upper end is extension 34 which is of lesser diameter than the pole and forms a shoulder 35 with the pole where they intersect.

This arrangement may be expanded to include a second pole extension pole 40 of selected length secured over extension 34 and engaging with the lower side 16 of feeder 10, in known manner, supporting the feeder in a fixed vertical position.

Tray 36 is positioned with pole 32 extending through opening 38 and preferably with its planar surface on the upper side, as shown in FIG. 9.

It is desirable that tray 36 be located about 12" below lower side 16 of feeder 10 to allow sufficient space for birds to feed and space for the tray to tilt to a diagonal or discharge position. Also, this distance requires a squirrel to climb the pole or other support in order to reach the feeder.

A first multi-directional tilt connector arrangement for mounting tray 36 beneath feeder 10 comprises positioning a flat washer 46 over extension 34 to rest on shoulder 35 and a cone-shaped washer 48 over extension 34 to rest on the flat washer. Flat washer 46 has a diameter greater than the diameter of circular opening 38 while cone-shaped washer 48 has a maximum diameter slightly less than that of opening 38. Preferably, the diameter of the cone-shaped washer is 1 5/16" and flat washer is 1 3/4.

Tray 36 is supported in its elevated horizontal position by flat washer 46 and shown in FIG. 1. Cone-shaped washer 48, as seen in FIGS. 1 and 4, acts to keep tray 36 centered along the vertical axis by passing through opening 38 when the tray is in its horizontal position but allows tray 36 to tilt to a diagonal or discharge position when engaged by a heavy object such as a squirrel, as seen in FIG. 4.

Figure 14A:
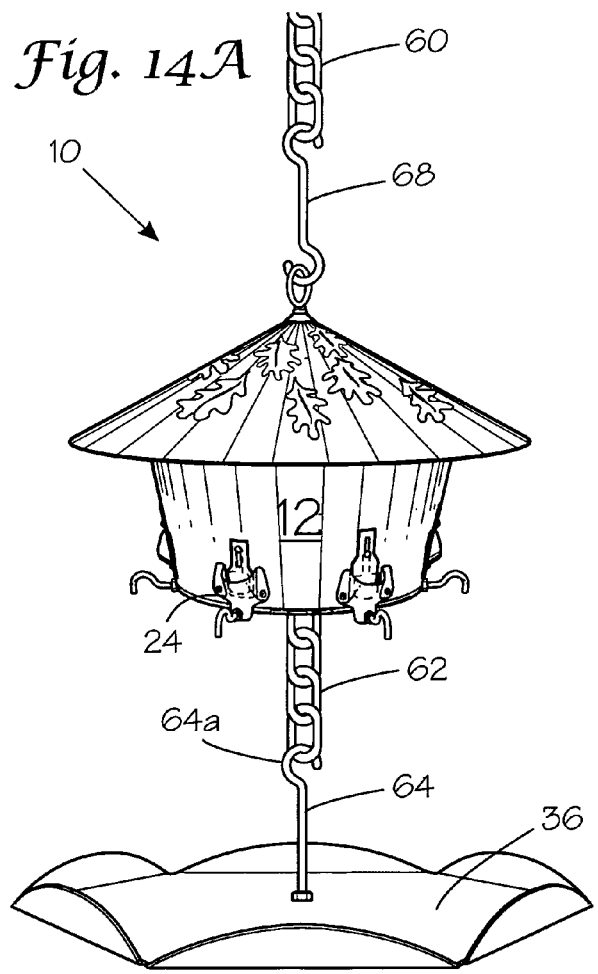
FIGS. 14A-14C illustrate another embodiment of a multi-directional connector for a squirrel guard according to the invention.

This connector arrangement may be slightly altered when supporting tray 36 by a chain 62, as shown in FIGS. 6 and 14a which has been found to be a most effective connector in throwing off a squirrel because of the increased tilt achieved. A pole and/or chain 62 are secured with underside 16 of the feeder and may include a hook extension 64 on its lower end. Flat and cone-shaped washers 46, 48 may be secured with the lower end of hook extension 64 to support tray 36 in the manner as above described. Hook 64 is affixed to tray 36 and hooked on chain 62 connected on the other end to an eye (hot shown) on the bottom of the feeder housing. In other arrangements, hook 64 may be on the bottom center of feeder 10 and the eye attached to the tray. The eye and hook may be used interchangeably. Hook 64 may be of other forms such as a flat piece of metal with a through-hole attached to the chain. A collar 66 may be provided to center cone-shaped washer 48. See FIG. 7. In FIG. 14a, the cone-shaped washer is avoided and the hook extension is affixed directly to the tray 36 by nuts (FIG. 14B) on the threaded shank of the hook, by welding, or other suitable means.

Another arrangement, as shown in FIGS. 3 and 4, would be to position the flat and cone-shaped washers 46, 48 to rest on shoulder 35 of pole 32, as above described, to position tray 36 on the washers as described.

C-shaped rod 50 having a connector 52 arranged at one end is provided. Connector 52 is engaged over extension 34 of pole 32 as shown in FIGS. 4 and 5, to position the C-shaped rod in a generally vertical position. Feeder 10 is supported by ring 18 which is engaged within the C-shaped rod with its lower end spaced above tray 36 by about 15". A connector 68, comprising a rod with opposed hooks, mayor may not be provided.

Another embodiment is to provide additional openings 54, preferably three, about opening 38. Providing a plurality of flexible extensions 44 and securing lower ends with the additional openings 54 and securing the upper ends of flexible extensions 44 with lower side of feeder 10 or with a ring 42 as shown in FIG. 9. Tray 36 extends downwardly generally perpendicular with the vertical axis of pole 32. The flexible extensions 44 support tray 36 at a desired distance from lower side 16 in a generally horizontal position. The application of weight to one edge causes the tray to tilt to a generally diagonal or discharge position.

Figure 8:
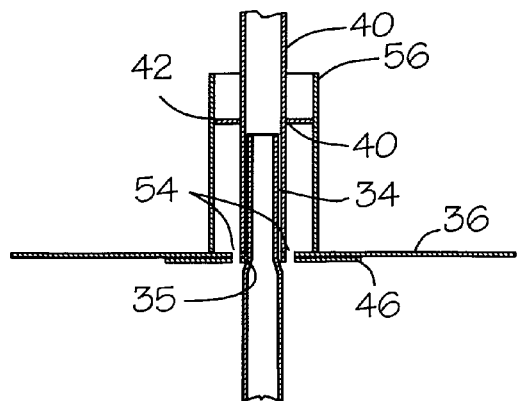
FIG. 8 is a perspective view of another tray supporting arrangement.
Figure 10:
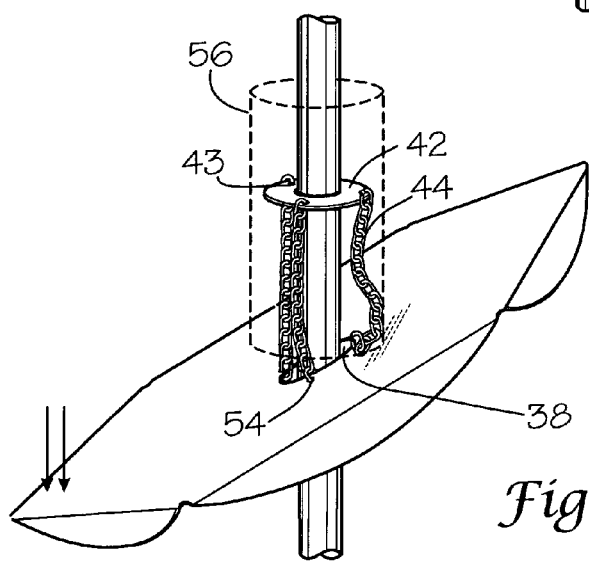
FIG. 10 is similar to FIG. 9 showing the tray in its diagonal position.

As can best be seen in FIGS. 8-10, another arrangement would be to have a ring 42 affixed to pole 40, as by welding and the like, with pole 40 being received over extension 34. The ring has openings 43 to receive the upper ends of flexible extensions 44. Tray 36, through openings 54, is connected with lower ends of flexible extensions 44. The feeder in both arrangements may be supported in an elevated position from either its roof 14 or its lower side 16 using these alternative arrangements. See FIGS. 8-10. It is desired to limit the flexible extensions to three.

When employing flexible extensions 44, it may be desirable to cover the extensions. Hollow tube 56 may be positioned to extend over flexible extensions 44 and rest on tray 36. When ring 42 is used, tube 56 covers the ring also. Tube 56 does not interfere with the tilting action of tray 36 as it is not attached. See FIG. 10. The tube merely covers the flexible extensions to prevent these being engaged by a squirrel.

The cone-shaped washer may be formed with two flat sides. In this arrangement, the larger flat side would be connected in fixed position with the tray and the smaller flat side positioned in engagement with the flat washer. The opening through the cone-shaped washer would be enlarged so that a tilting action would occur between the cone-shaped washer and the flat washer when a weight engages the tray. The degree of tilt is determined by the size of the opening through the flat washer and tray.

The degree of tilt may also be adjusted when using the cone-shaped and flat washer by inserting collar 66 over the extension pole, increasing its diameter, and, thereby, reducing the open space between the extension pole and the opening in the tray. See FIG. 7. It may be desirable to provide a weight atop tray 36 and about extension 64 stabilize the tray.

Referring now to FIGS. 11A and 11B, a seed monitor 70 is shown incorporated into the bird feeder of the present invention to show the amount of seed in the feeder from a distance. The seed monitor includes a measurement rod 72 slideably received through a hole in the floor of the bird feeder housing. A float plate 74 is affixed to an upper end of measurement rod 72 which floats with the level of bird seed in the feeder. FIGS. 11A and 11B show the seed monitor in combination with the pole supported bird feeder of FIG. 1, in this case the measurement rod is mounted laterally offset from the central axis of the bird feeder to accommodate central support rods 32 and 40. As can best be seen in FIG. 11B, seed monitor 70 is shown in two positions. In the solid line position 76, the seed monitor is in a lower position indicating that the seed level is practically empty and needs to be refilled. In the upper dotted line position 78, the seed monitor is shown in dash lines at the full position. Of course, the measurement rod would indicate seed levels in between the full and empty positions.

Referring now to FIGS. 12A and 12B, the seed monitor embodiment of the present invention is illustrated with a C rod support ring 50 of FIG. 5, rather than a pole support. In this case, the seed monitor 70 may be centrally located in the bird feeder housing 12. The function of the seed monitor remains the same. In a lower position 76 measurement rod 72 is at its empty position, and in the dotted line position, the measurement rod is seen in the full position 78.

Figures 13A, 13B, 13C, 13D:
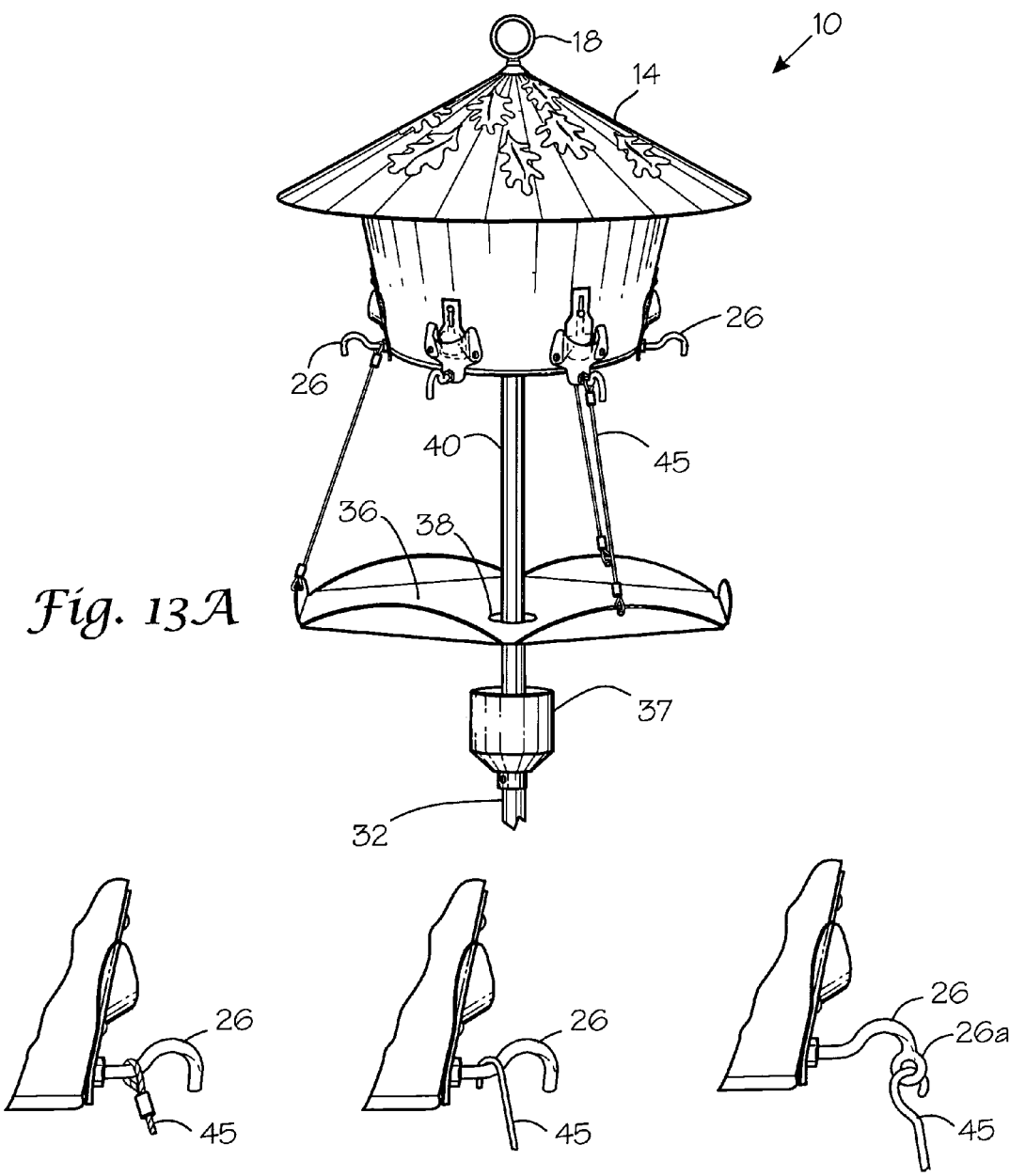
FIGS. 13A-13D disclose another embodiment of a multi-directional connector in accordance with the invention.

FIG. 13 shows a squirrel guard 36 carried by a bird feeder 10 by means of flexible extensions 45. However, here, the extensions are secured on one end with bird perches 26 and on the opposite end with tray 36 so that the tray pivots about pole 40 from a generally horizontal to an inclined position under the weight of a squirrel and the like. For this purpose, the opening in the center of the tray is enlarged so the tray pivots ±45° under the weight of the squirrel. The extensions may include cable (FIG. 13B, wire and hook (FIG. 13C), or rod (FIG. 13D) and the like, e.g., springs, bungee cords, rope, which diverge outwardly rather than generally parallel to the pole. While shown with a support pole 40, the feeder may also be used without a pole. The embodiment of FIG. 13D advantageously includes an eye 26a for retaining the hook end of rod 45.

Figure 14B:
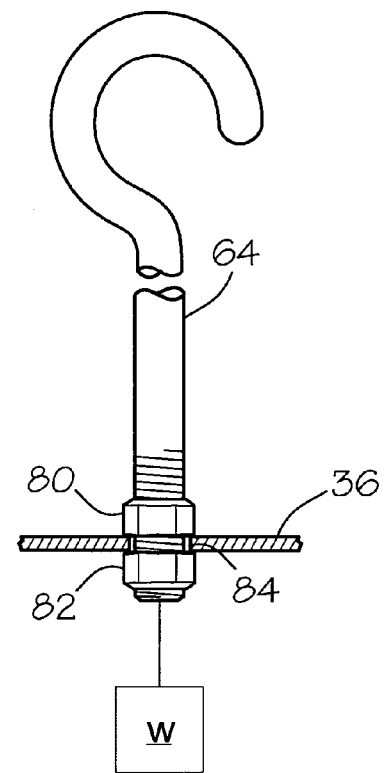
Figure 14C:
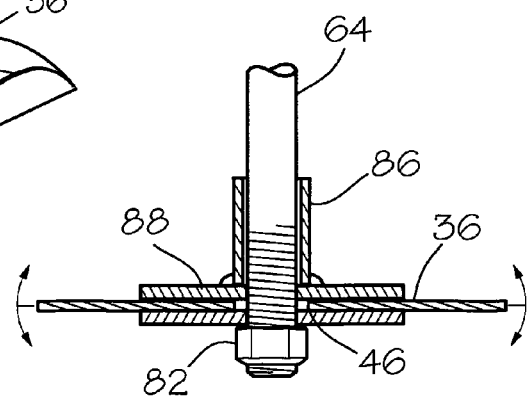

FIGS. 14A-14C illustrate another embodiment of a multi-directional connector 79 which allows tray 36 to tilt or swivel under the weight of a squirrel and the like. In this arrangement there is no relative movement between the tray and the supporting rod 64 extending through the tray. Instead, the rod is affixed to the tray, but tilts about a hook and chain arrangement, 62, 64a above the tray. The arrangement includes rod 64 affixed to tray 36 by two lock nuts 80,82, or a threaded hole 84 in the plate and one lock nut 82. In this manner, the distance between the tray and feeder can also be adjusted by selecting a different chain link for the hook and accommodate different size birds and animals.

Figure 15:
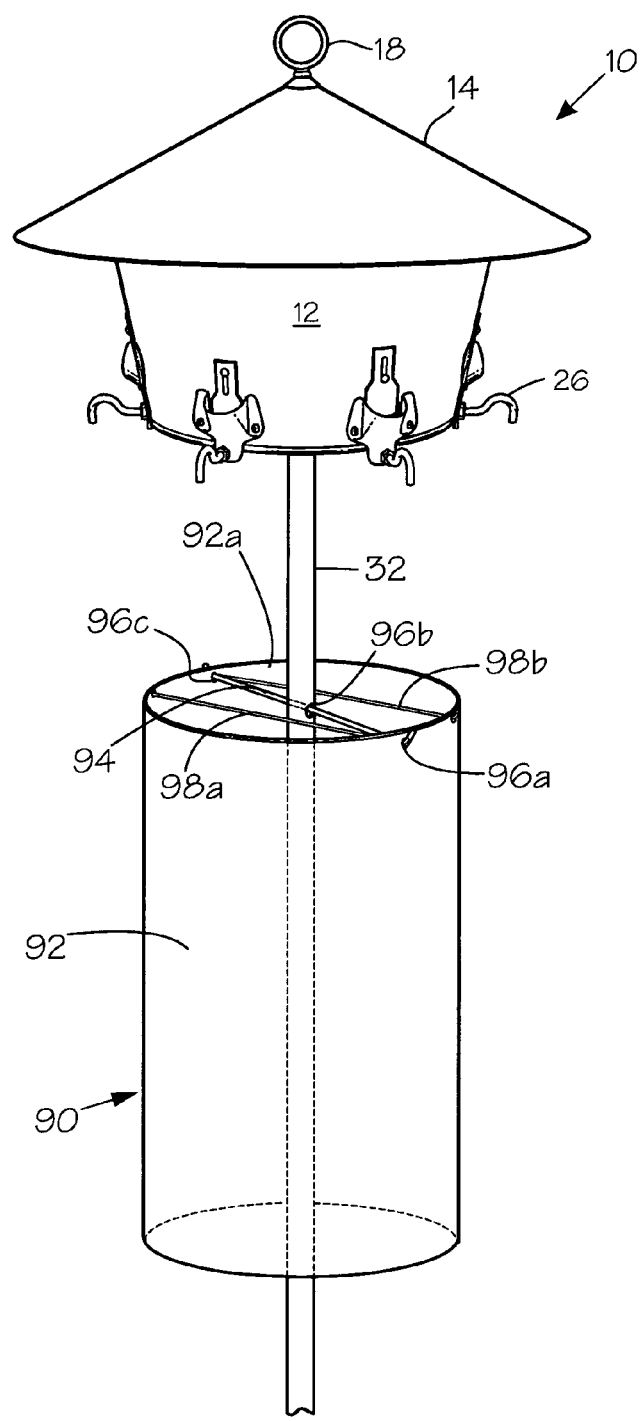
FIG. 15 illustrates another embodiment of a squirrel guard, according to the invention.

FIG. 15 illustrates another embodiment of a squirrel guard 90 according to the invention which comprises an elongated cylindrical baffle 92 surrounding support pole 32. The baffle is supported by means of connector member 94 comprising a cable, wire, or rod extending through hole 96a on one side of the baffle, a hole 96b in pole 32, and a hole 96c on the opposing side of the baffle. The connector member is secured to the baffle at holes 96a and 96c. Additional connector members 98a and 98b can be strung across the open top 92a of baffle 92 to prevent any squirrels reaching the top of the baffle, from exiting the open end and reaching the bird feeder 10. A squirrel will not be able to climb the baffle on the outside, or pass through the interior of the baffle. Thus, it can be seen that an advantageous construction can be had for a variation for a squirrel guard.

Figures 16, 17:
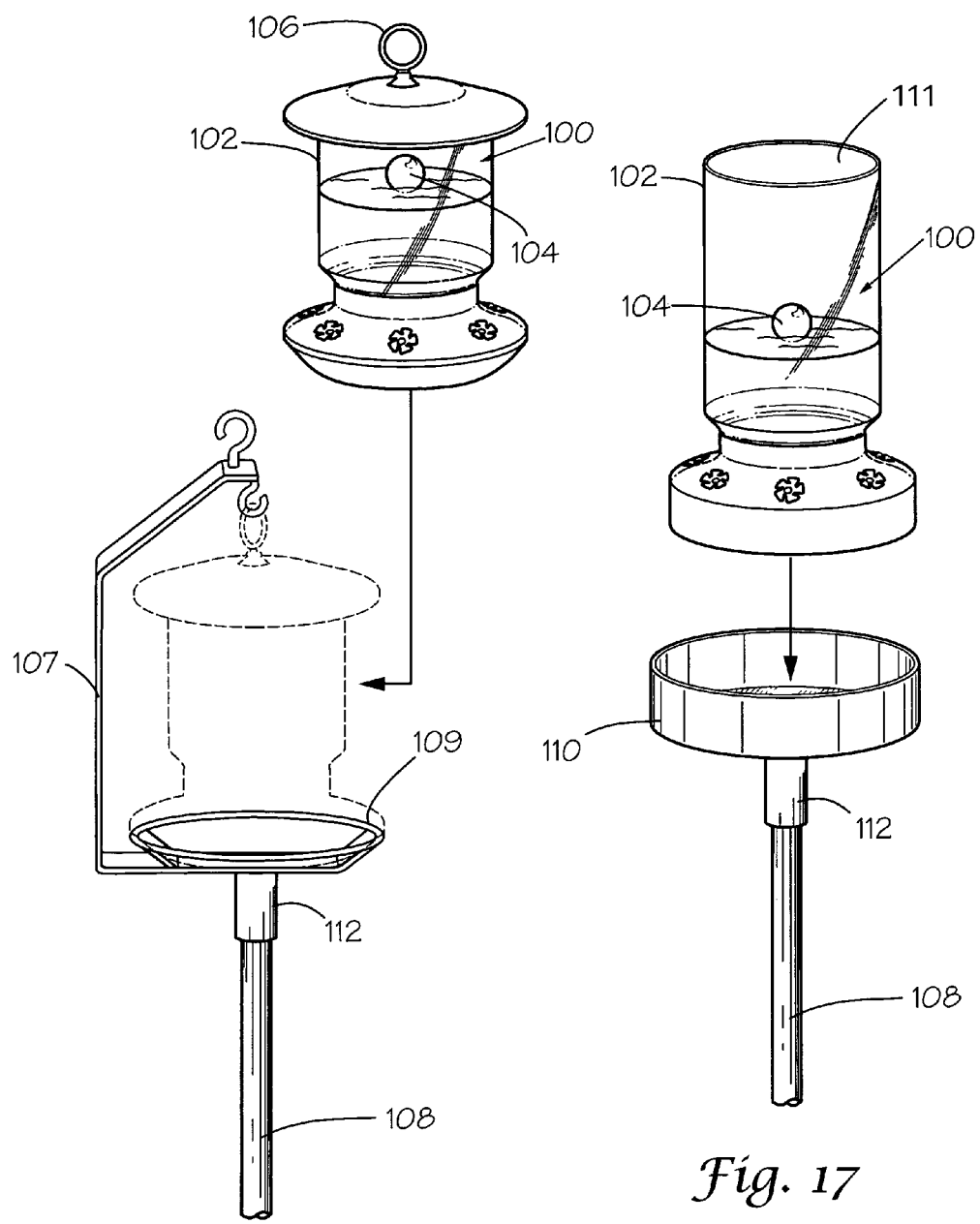
FIG. 16 shows another version of a feed monitor for a bird feeder containing a liquid feed, according to the invention.
FIG. 17 illustrates a version for supporting a bird feeder.

FIG. 16 shows another version of a feed monitor 100 for a feeder 102 containing a liquid feed instead of solid seed, for example, in a hummingbird feeder. In that case a floating (ball), preferably plastic, sensor 104 is used to rise and fall with the liquid feed. It has also been found if the sugar level, i.e. specific gravity, in the feeder is not sufficient, the plastic float will be at least partially or fully submerged. In this case the visibility of the float will be reduced. The feeder may be suspended by a ring 106 (FIG. 16) or by a ground pole 108 (FIG. 17). Ring 106 can be suspended by a C-Frame having a bottom leg affixed to a short pipe 112 integral with pole 108 by welding and the like. The feeder may be lifted from the ring and removed. Alternately, the feeder may be supported from the bottom by welding the feeder bottom to the short pole 112 or welding a base receptacle 110 to the short pipe and placing the bottom of the feeder into the receptacle (FIG. 17). In the case of FIG. 17, the top of the feeder may not be needed. Preferably, the ant mote 37 (FIGS. 1A, 1B) is affixed to the pole 108 below the feeder. The steady mounting of the feeder rigidly on the pole prevents liquid feed from leaking as occurs when the feeder swings by a chain in high winds.

While a preferred embodiment of the invention has been described using specific terms, such description is for illustrative purposes only, and it is to be understood that changes and variations may be made without departing from the spirit or scope of the following claims.

What is claimed is:

1. A bird feeder for storing and dispensing bird seed comprising:

an upstanding feeder housing formed along a vertical axis, including side walls, a roof and a floor adjacent its lower side for containing bird seed;
a support for supporting said feeder in an elevated position;
a squirrel guard comprising a generally planar tray having a generally circular tray opening through which a pole is received, said tray being mounted beneath said floor and lower side to prevent squirrel access to said bird seed and as a collection tray for spilled bird seed;
a tilt connector operatively associated with said pole and said tray beneath said lower side for supporting said planar tray in a generally horizontal seed collecting position generally perpendicular to said vertical axis when bird seed is carried by said tray and for allowing said tray to tilt about said pole to a discharge position generally diagonal of said vertical axis when engaged by a relatively heavy weight;
said connector comprising a pole in pivotal engagement with said squirrel guard tray along said axis, said pivotal engagement including a space defined in said tray opening between said tray and said pole so that said tray tilts between said discharge position and said horizontal position in all directions;
wherein said tray normally remains in said collecting position collecting spilled bird seed but is moved to said discharge position when engaged by a squirrel, and the like, causing said squirrel to fall from said tray and away from said bird feeder.

2. The arrangement according to claim 1 wherein said tilt connector comprises a flat washer and a generally cone-shaped washer concentric with said pole in spaced position beneath said lower side, said flat washer engaging an underside of said tray supporting said tray in said generally horizontal position while said cone-shaped washer engages an inner edge of said tray opening maintaining said tray centered about said vertical axis, said cone-shaped washer allowing said tray to pivot to said discharge position when engaged by said squirrel and guides said tray to said centered and horizontal position upon departure of said squirrel.

3. The arrangement according to claim 2 wherein said tray opening is about 1 3/16" in diameter, said flat washer is 1 3/4" in diameter, and said cone-shaped washer is about 1 5/16" in diameter.

4. The arrangement of claim 2 wherein said support comprises said pole being secured at a lower end with the ground to extend generally vertically, an extension formed at an upper end of said pole, said extension having a shoulder supporting said cone-shaped washer over said flat washer forming said connector.

5. The arrangement according to claim 4 including an extension pole supported at said upper end over said extension and engaged with an opposite end with said bird feeder.

6. The arrangement according to claim 4 wherein said extension is secured in fixed position with said bird feeder.

7. The arrangement of claim 1 wherein said multi-directional connector comprises a plurality of flexible members depending downwardly from said feeder housing connecting with said squirrel feeder tray.

8. The arrangement of claim 7 wherein said plurality of flexible members extend generally parallel of said vertical axis beneath said lower side, said members being engaged with said tray generally adjacent and about said circular tray opening.

9. The arrangement of claim 8 wherein upper ends of said flexible members are connected with a ring carried by the pole beneath said lower side.

10. The arrangement according to claim 7 including a flexible member guard comprising an elongated hollow member which encases said flexible members and is supported on an upper side of said tray, said guard being capable of mufti-directional movement to allow said tray to tilt to said discharge position.

11. The arrangement according to claim 7 including bird feeding openings and perches spaced about the periphery of said housing; and said flexible members are connected between an outer circumference of the tray at the bottom and said perches at the top wherein said flexible members diverge outwardly from said feeder to said tray.

12. The arrangement of claim 1 including a C-shaped rod engaged with an upper end of said pole above said tray wherein said C-shaped rod is engaged with said feeder at an opposite end.

13. The arrangement of claim 1 wherein said support includes a C-shaped rod engaged at one end with said pole to extend along a generally vertical plane and engaged at an opposite end with said roof; whereby,
Said feeder is held in said elevated position above said tray.

14. The arrangement according to claim 1 wherein said tray includes spaced turned edges extending generally perpendicular of said planar surface, said turned edges may extend in an upwardly or downwardly direction when said tray is in position.

15. The arrangement of claim 1 including a seed monitor carried by said bird feeder having an external indicator member indicating the amount of feed in the feeder from a distance.

16. The arrangement of claim 15 wherein the indicator includes a measuring rod depending from said feeder, and a float member that moves up and down with feed level operatively connected with said measuring rod so that said rod moves with said float member to indicate the amount of the feed in the feeder.

17. The arrangement of claim 1 including a double feeder floor in the lower part of said feeder having an upper perforated floor for water drainage and a lower floor spaced below said perforated floor.

18. The arrangement of claim 1 wherein said lower floor includes a drain which can be opened for emptying water from said lower floor.

19. The arrangement of claim 1 wherein said multi-directional connector includes a central chain connected between said feeder and said guard tray.

20. A bird feeder for storing and dispensing bird seed comprising:
an upstanding bird feeder housing including side walls, a roof and a floor for containing bird seed;
a support for positioning said feeder housing in an elevated position above the ground;
a squirrel guard comprising a planar tray having a generally central tray opening, said tray being mounted beneath said floor to prevent squirrel access to said bird feed and as a collection tray for spilled bird feed;
a multi-directional tilt connector beneath said floor engaged with and maintaining said planar tray in a generally horizontal collecting position when only the bird feed weight is carried by said tray and allowing said tray to tilt to a discharge position generally when engaged by a relatively heavy weight so that said tray normally remains in said collecting position collecting spilled bird seed but is moved to said discharge position when engaged by a squirrel, and the like, causing said squirrel to fall from said tray and away from said bird feeder; and a pole extending through said tray opening of said squirrel guard wherein said multi-directional connector comprises a cone-shaped washer connected with said pole, and a tilt space defined between an inner edge of said tray opening and said pole and cone-shaped washer allowing said tray to pivot to said discharge position when engaged by said squirrel and guides said tray to said centered and horizontal position upon departure of said squirrel.

21. The arrangement according to claim 20 including a pole extending through said tray opening of said squirrel guard wherein said multi-directional connector comprises a flat washer and a cone-shaped washer secured with said pole in spaced position beneath said floor, said flat washer engaging an underside of said tray supporting said tray in said generally horizontal position while said cone-shaped washer engages an inner edge of said tray opening maintaining said tray centered about said pole, said cone-shaped washer allowing said tray to pivot to said discharge position when engaged by said squirrel and guides said tray to said centered and horizontal position upon departure of said squirrel.

22. The arrangement of claim 20 wherein said support comprises said pole being secured at a lower end with the ground to extend generally vertically, an extension formed at an upper end of said pole, said extension having a shoulder supporting said cone-shaped washer over said flat washer forming said connector.

23. The arrangement according to claim 20 including bird feeding openings and perches spaced about the periphery of said housing; and said flexible members are connected between the outer circumference of the tray and said perches at the top.

24. The arrangement of claim 20 including an art guard carried in axial alignment with said pole beneath said squirrel guard tray to prevent ants from reaching the bird feed.

25. The arrangement of claim 20 including bird feeding openings formed around the periphery of said bird feeder wall; and a sliding gate co-extending with said opening to control the size of the opening for different type birds.

26. The arrangement of claim 25 including bird feeding openings formed around the periphery of said bird feeder wall; and a sliding gate co-extending with said opening to control the size of the opening for different type seeds.

27. The arrangement of claim 20 including a double feeder floor in the lower part of said feeder having an upper perforated floor for water drainage and a lower floor spaced below said perforated floor.

28. The arrangement of claim 27 wherein said lower floor includes a drain which can be opened for emptying water from said lower floor.

29. A bird feeder for storing and dispensing bird seed comprising:
a feeder housing having a vertical axis, and including side walls, a roof and a floor adjacent its lower side for containing bird seed;
a support for supporting said feeder housing in an elevated position above the ground;
a tiltable squirrel guard disposed below the feeder housing having a first generally horizontal position for catch bird seen falling from said feeder and a tilt position wherein an animal of sufficient weight causes said guard to tilt and throw the animal off of the guard; and
a seed monitor carried by said bird feeder having a reciprocating external indicator which is visible a distance from said bird feeder, and a float member that moves up and down with feed level operatively connected with said external indicator so that said indicator moves with said float member to indicate the amount of the feed in the feeder from said distance.

30. The feeder of claim 29 wherein said squirrel includes a tray having a central tray opening; a ground pole received through said tray opening for supporting said feeder above the ground; a tilt connector operatively associated with said pole and said squirrel guard tray providing a first position in which said guard is generally parallel to said vertical axis and a second position in which said guard tilts relative to said pole when engaged by a squirrel and the like to discharge the same;
a tilt space formed between an inner edge of said central tray opening and said ground pole to provide a clearance allowing said guard tray to tilt relative to said feeder.

31. The arrangement of claim 30 wherein said tilt connector includes an elongated shroud surrounding said pole, and at least one transverse member extending though said pole and connecting to opposing edges of said shroud.

32. The arrangement of claim 30 wherein said tilt connector includes a conical member having a central opening, said pole extending through said central opening while said conical members is disposed in said guard opening so that said guard tilts about said conical member.

33. The arrangement of claim 29 wherein said tilt connector includes a length of chain connecting said bird feeder and said guard tray by which said tray swings freely to discharge said animal.

34. The arrangement of claim 33 including means for affixing one end of said chain to said tray and affixing another end of said chain to a bottom of said feeder.

35. The arrangement of claim 29 including a double feeder floor in the lower part of said feeder having an upper perforated floor for water drainage and a lower floor spaced below said perforated floor from which said water may be drained.

36. The arrangement of claim 29 including a double feeder floor in the lower part of said feeder having an upper perforated floor for water drainage and a lower floor spaced below said perforated floor from which said water may be drained.

37. A bird feeder for storing and dispensing bird seed comprising:
an upstanding feeder housing formed along a vertical axis, including side walls, a roof and a floor adjacent its lower side for containing bird seed;
a support for supporting said feeder in an elevated position;
a squirrel guard comprising a generally planar tray having a generally circular tray opening through which a pole is received, said tray being mounted beneath said floor and lower side to prevent squirrel access to said bird seed and as a collection tray for spilled bird seed;
a tilt connector operatively associated with said pole and said tray beneath said lower side for supporting said planar tray in a generally horizontal seed collecting position generally perpendicular to said vertical axis when bird seed is carried by said tray and for allowing said tray to tilt about said pole to a discharge position generally diagonal of said vertical axis when engaged by a relatively heavy weight;
said support including a C-shaped rod engaged at one end with said pole to extend along a generally vertical plane and engaged at an opposite end with said roof;
wherein said tray normally remains in said collecting position collecting spilled bird seed but is moved to said discharge position when engaged by a squirrel, and the like, causing said squirrel to fall from said tray and away from said bird feeder;
whereby said feeder is held in said elevated position above said tray.

38. A bird feeder for storing and dispensing bird seed comprising:
- an upstanding feeder housing formed along a vertical axis, including side walls, a roof and a floor adjacent its lower side for containing bird seed;
- a support for supporting said feeder in an elevated position;
- bird feeding openings formed around the periphery of said bird feeder side wall; and a sliding gate co-extending with said opening to control the size of the opening for different type seeds;
- a squirrel guard comprising a generally planar tray having a generally circular tray opening through which a pole is received, said tray being mounted beneath said floor and lower side to prevent squirrel access to said bird seed and as a collection tray for spilled bird seed;
- a tilt connector operatively associated with said pole and said tray beneath said lower side for supporting said planar tray in a generally horizontal seed collecting position generally perpendicular to said vertical axis when bird seed is carried by said tray and for allowing said tray to tilt about said pole to a discharge position generally diagonal of said vertical axis when engaged by a relatively heavy weight;
- wherein said tray normally remains in said collecting position collecting spilled bird seed but is moved to said discharge position when engaged by a squirrel, and the like, causing said squirrel to fall from said tray and away from said bird feeder.

39. A bird feeder for storing and dispensing bird seed comprising:
- an upstanding feeder housing formed along a vertical axis, including side walls, a roof and a floor adjacent its lower side for containing bird seed;
- a support for supporting said feeder in an elevated position;
- a squirrel guard comprising a generally planar tray having a generally circular tray opening through which a pole is received, said tray being mounted beneath said floor and lower side to prevent squirrel access to said bird seed and as a collection tray for spilled bird seed;
- a tilt connector operatively associated with said pole and said tray beneath said lower side for supporting said planar tray, in a generally horizontal seed collecting position generally perpendicular, to said vertical axis when bird seed is carried by said tray and for allowing said tray to tilt about said pole to a discharge position generally diagonal of said vertical axis when engaged by a relatively heavy weight;
- said tilt connector being disposed between said tray and said pole supporting said tray in a generally horizontal position relative to said pole, and said tray opening is enlarged relative to said pole to allow said tray to pivot to said discharge position when engaged by said heavy weight; and
- said tilt connector comprising a plurality of flexible members depending downwardly from said feeder housing connecting with said squirrel feeder tray;
- wherein said tray normally remains in said collecting position collecting spilled bird seed but is moved to said discharge position when engaged by a squirrel, and the like, causing said squirrel to fall from said tray and away from said bird feeder.

40. The arrangement of claim 39 wherein said support pole and tray are fixed together against rotation, and an upper attachment of said connector is releasably attached to one of flexible members extending between said feeder and said support pole.

41. A bird feeder for storing and dispensing bird seed comprising:
- an upstanding bird feeder housing including side walls, a roof and a floor for containing bird seed;
- a support for positioning said feeder housing in an elevated position above the ground;
- a squirrel guard comprising a planar tray having a generally central tray opening, said tray being mounted beneath said floor to prevent squirrel access to said bird feed and as a collection tray for spilled bird feed;
- a multi-directional tilt connector beneath said floor engaged with and maintaining said planar tray in a generally horizontal collecting position when only the bird feed weight is carried by said tray and allowing said tray to tilt to a discharge position generally when engaged by a relatively heavy weight so that said tray normally remains in said collecting position collecting spilled bird seed but is moved to said discharge position when engaged by a squirrel, and the like, causing said squirrel to fall from said tray and away from said bird feeder; and
- an ant guard carried in axial alignment with said pole beneath said squirrel guard tray to prevent ants from reaching the bird feed.

42. A bird feeder for storing and dispensing bird seed comprising:
- an upstanding bird feeder housing including side walls, a roof and a floor for containing bird seed;
- a support for positioning said feeder housing in an elevated position above the ground;
- a squirrel guard comprising a planar tray having a generally central tray opening, said tray being mounted beneath said floor to prevent squirrel access to said bird feed and as a collection tray for spilled bird feed;
- a multi-directional tilt connector beneath said floor engaged with and maintaining said planar tray in a generally horizontal collecting position when only the bird feed weight is carried by said tray and allowing said tray to tilt to a discharge position generally when engaged by a relatively heavy weight so that said tray normally remains in said collecting position collecting spilled bird seed but is moved to said discharge position when engaged by a squirrel, and the like, causing said squirrel to fall from said tray and away from said bird feeder; and
- wherein said multi-directional connector includes a central chain connected between said feeder and said guard tray.

* * * * *